United States Patent
Troitski

(10) Patent No.: US 6,509,548 B1
(45) Date of Patent: Jan. 21, 2003

(54) METHOD AND LASER SYSTEM FOR PRODUCTION OF HIGH-RESOLUTION LASER-INDUCED DAMAGE IMAGES INSIDE TRANSPARENT MATERIALS BY GENERATING SMALL ETCH POINTS

(76) Inventor: Igor Troitski, 853 Arrowhead Trail, Henderson, NV (US) 89015

( * ) Notice: Subject to any disclaimer, the term of this patent is extended or adjusted under 35 U.S.C. 154(b) by 71 days.

(21) Appl. No.: 09/679,201

(22) Filed: Oct. 4, 2000

(51) Int. Cl.⁷ .............................................. B23K 26/00
(52) U.S. Cl. ............................ 219/121.69; 219/121.61; 219/121.68
(58) Field of Search ....................... 219/121.61, 121.68, 219/121.69, 121.85; 148/525, 565

(56) References Cited

U.S. PATENT DOCUMENTS

| | | | |
|---|---|---|---|
| 4,092,518 A | 5/1978 | Merard | 219/121.69 |
| 4,843,207 A | 6/1989 | Urbanek | 219/121.68 |
| 5,206,496 A | 4/1993 | Clement | 219/121.6 |
| 5,575,936 A | 11/1996 | Goldfarb | 219/121.68 |
| 5,637,244 A | 6/1997 | Erokhin | 219/121.69 |
| 5,886,318 A | 3/1999 | Vasiliev et al. | 219/121.69 |
| 6,087,617 A | 8/2000 | Tpoitski et al. | 219/121.6 |
| 6,333,486 B1 * | 12/2001 | Troitski | 219/121.69 |

FOREIGN PATENT DOCUMENTS

| | | |
|---|---|---|
| EP | 0743 128 A1 | 5/1995 |
| RU | 321422 | 11/1970 |
| RU | 20082288 C1 | 2/1994 |
| RU | WO 96/30219 | 3/1995 |
| SU | 1838163 | 3/1992 |

OTHER PUBLICATIONS

1. J.R. Bettis et al. "Spot Size and Pulse Duration Dependence of Laser–Induced Damage", Damage in Laser Materials: 1976, Glass, et al. (Editors), NBS Special Publication # 462 (1976),pp. 338–343.

2. A. Vaidyanathan et al. "Competing Mechanisms in Laser–Induced Damage", Damage in Laser Materials: 1979, Bennet et al. (Editors), NBS Special Publication #568 (1979), pp. 457–465.

3. E.W. Van Stryland et al. "Pulse–Width and Focal–Volume Dependence of Laser–Induced Breakdown",Damage in Laser Materials: 1980, Bennet et al. (Editors), NBS Special Publication # 620 (1981), pp. 375–383.

4. J.R. Bettis, "Electron Tunnel Ionization: The Pulse Length and Wavelength Dependence", Laser–Induced Damage in Optical Materials: 1999, Exarhos et al. (Editors), SPIE Vol. 3902 (2000) pp. 302–316.

* cited by examiner

*Primary Examiner*—Geoffrey S. Evans

(57) ABSTRACT

A method and apparatus for production of high-resolution laser-induced damage images by small etch points is based on generation of the initial electron density in the relatively large volume, creation of the breakdown at a small part of the said volume and control of the energy amount enclosed inside the plasma. The method uses two laser radiations: the first has comparatively long pulse width, its energy does not exceed damage threshold value, and it is focused at relatively large focal spot; the second has shorter pulse duration, it is focused at smaller spot and its energy exceeds appropriate threshold value. The system produces laser-induced damage images by joint using of an optical scanner (deflector) and a drive table for movement of article. The system works without interruption of article movement relative to the laser beam and creates image areas with different brightness by modulation of article replacement speed and frequency of scanning.

11 Claims, 2 Drawing Sheets

METHOD AND LASER SYSTEM FOR PRODUCTION OF HIGH-RESOLUTION LASER-INDUCED DAMAGE IMAGES INSIDE TRANSPARENT MATERIALS BY GENERATING SMALL ETCH POINTS

FIELD OF THE INVENTION

The present invention relates to a method and apparatus for producing high quality laser-induced damage images in transparent objects.

BACKGROUND OF THE INVENTION

A number of techniques for creating a variety of patterns on the surface and inside of transparent substrates using pulsed laser radiation are well known.

One publication disclosing such techniques is the Russian invention # 321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. patent application Ser. No. 09/354,236 to Troitski discloses a laser-computer graphic system for generating portrait and 3-D reproductions inside optically transparent material. Accordance to the invention, production of a portrait of the same resolution like a computer image is made by using a multi-layer picture. Points of every layer are arranged so that the distance between adjacent etch points are equal to the minimal distance between etch points that can be provided without the breakage of the material. Every layer is parallel with respect to the portrait plane, and distance between parallel planes is set equal to minimal distance at which the breakage of the material does not occur.

U.S. patent application Ser. No. 09/356,252 to Troitski discloses method and laser system for generating the etch points with improved characteristics inside optically transparent material. According to the invention two laser beams are directed at the same focal point inside transparent material. The first and the second laser beams have energy levels below an energy level sufficient to cause breakdown of the material but combination of their energy levels is greater than breakdown threshold. The first and the second laser beams are directed at the same point in directions generally perpendicular to one another.

U.S. patent application Ser. No. 09/557,306 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

The patents referred above disclose methods and systems producing laser-induced damage images by using Nd-YAG laser operating at a wavelength of 1064 nm and generating an emission having a pulse duration of several tens of nanoseconds. These systems focus beam at a spot of relatively large volume that creates laser-induced damages of relatively large scale. Consequently an image is a block of relatively large damages and different shades of gray are reproduced by variation of damage brightness. Such task solution of creation of laser-induced damage images (the selection of a wavelength, a pulse duration and a focal volume) results from numerous theoretical and experimental investigations carried out in different research laboratories for many years.

For example, J. R. Bettis, R. A. House I I, and A. H. Guenter, "Spot Size and Pulse Duration Dependence of Laser-lnduced Damage", Damage in Laser Materials: 1976, Glass, et al. (Editors), NBS Special Publication # 462 (1976), pp. 338–343. The scientists describe that the threshold electric field for laser-induced damage in transparent dielectrics follows an inverse relation with the fourth root of the pulse duration. Furthermore they show that the threshold follows an inverse relation with the square root of the damage spot size.

A. Vaidyanathan, T. W. Walker, and A. H. Guenther "Competing Mechanisms in Laser-Induced Damage", Damage in Laser Materials: 1979, Bennett, et al. (Editors), NBS Special Publication # 568 (1979), pp. 457–465. It reports that the experimental pulse width dependence of the damage fields at 1064 nm can be approximated in form $t_p^{-1/4}$.

E. W. Van Stryland, M. J. Soileau, Arthur L. Smirt, and William E. Williams, "Pulse-Width and Focal-Volume Dependence of Laser-Induced Breakdown", Damage in Laser Materials: 1980, Bennett, et al. (Editors), NBS Special Publication # 620 (1981), pp. 375–383. It represents the laser-induced breakdown field at 1064 nm, which was measured for various focal volumes and laser pulse width on the same samples. The results of these measurements for solid materials were fit to a simple linear dependence of the breakdown field on the product $t_p^{-1/4}V^{-1}$, where $t_p$ is the laser pulse width and V is the focal volume.

J. R. Bettis, "Electron Tunnel Ionization: The Pulse Length and Wavelength Dependence", Laser—Induced Damage in Optical Materials: 1999, Exarhos, et al. (Editors), SPIE Volume (2000) pp. 302–316. The draftsman checking the last 30 years of the Damage Symposium reveals threshold field variation with pulse duration ranging from $t^{-0.15}$ to $t^{-0.4}$ with the generally accepted value of $t^{-0.25}$. He does also the major conclusion that the threshold field is increased with wavelength as $\lambda^{0.77}$. This theoretical result isn't entirely unexpected given the experimental evidence of numerous scientists who showed that the threshold fields increases with wavelength at about the 0.74 power.

The laser-induced damage volume ($V_d$) is larger than the focal volume ($V_f$) and it is determined by the total in-focus laser energy ($E_0$): when $E_0$ exceeding the threshold value is on the increase, the distinction between $V_d$ and $V_f$ grows. In turn the value of $E_0$ is in direct proportion to the pulse duration, to the focal volume and to the threshold density energy $E_{th}$. Thereby for creation of small laser-induced damages it is necessary to reduce the pulse duration, the focal volume and the threshold value. However, as was shown in the articles referred to above, when the pulse duration or the focal volume grows down, the value of the threshold fields rises. Just this fact brings to using relatively large laser-induced damages for production of the images inside transparent materials.

However, the utilization of the large etch points limits the resolving capacity of laser-induced damage images. Therefore development of methods and systems for creation of small etch points and production of laser-induced damage images by using such small damages is an important, pressing problem.

U.S. patent Application Ser. No. 09/651,076 to Troitski discloses the method and the system for production of single-layer high quality portraits with comparatively small etch points. Nevertheless, these etch points have yet enough large sizes so that every etch point can reproduce different gray shades by variation of its brightness. In addition, the method bases on the fact that a portrait has single layer.

The present patent application discloses the method and the systems for production of high resolution laser-induced damage images using so small etch points that it is not possible to reproduce different gray shades by the variation of the brightness of every etch point but by the variation of the compactness of damage arrangement.

SUMMARY OF THE INVENTION

The present invention has its principal task to disclose a method, systems and apparatus for creating high-resolution laser-induced damage images inside a transparent material.

One or more embodiments of the invention comprise a method for producing a small laser-induced damage by two steps: the first step is the generation of the initial electron density, which does not exceed but is nearly equal to the critical electron density corresponding to the breakdown; the second step is generation of the breakdown at a part of the first area and control of the amount of the energy enclosed inside the plasma.

One or more embodiments of the invention comprise a method and an apparatus for producing high-resolution laser-induced damage images by two laser radiations: the first has comparatively long pulse width, its energy does not exceed damage threshold value, and it is focused at a relatively large focal spot; the second has shorter pulse duration, it is focused at a smaller focal spot and its energy exceeds appropriate threshold value.

One or more embodiments of the invention comprise a laser system for producing laser-induced damage images with small etch points by using the local control of a beam direction together with the variation of the relative position of the optical system and a work article.

One or more embodiments of the invention comprise the methods of image gradation reproduction by controlling the speed of an article movement relatively beam direction or by controlling the repetition frequency of the laser pulse radiation.

DESCRIPTION OF THE DRAWINGS

FIG. 1(*a*) shows a focal area $\omega$ of transparent material, in which the initial electron density is created; nine areas $\in_j$, which are parts of $\omega$ and in which the critical electron density is created; the minimal distance between adjacent areas $\in_j$ (j=1 . . . 9) is $d_0$. FIG. 1 (*b*) shows a pulse train: the first pulse creates the initial electron density inside area $\omega$, has the pulse duration $t_{p1}$ and energy level $E_1$, the following (nine) pulses create the critical electron density successively at all nine areas $\in_j$ (j=1 . . . 9).

DETAILED DESCRIPTION OF THE INVENTION

Figure 1:
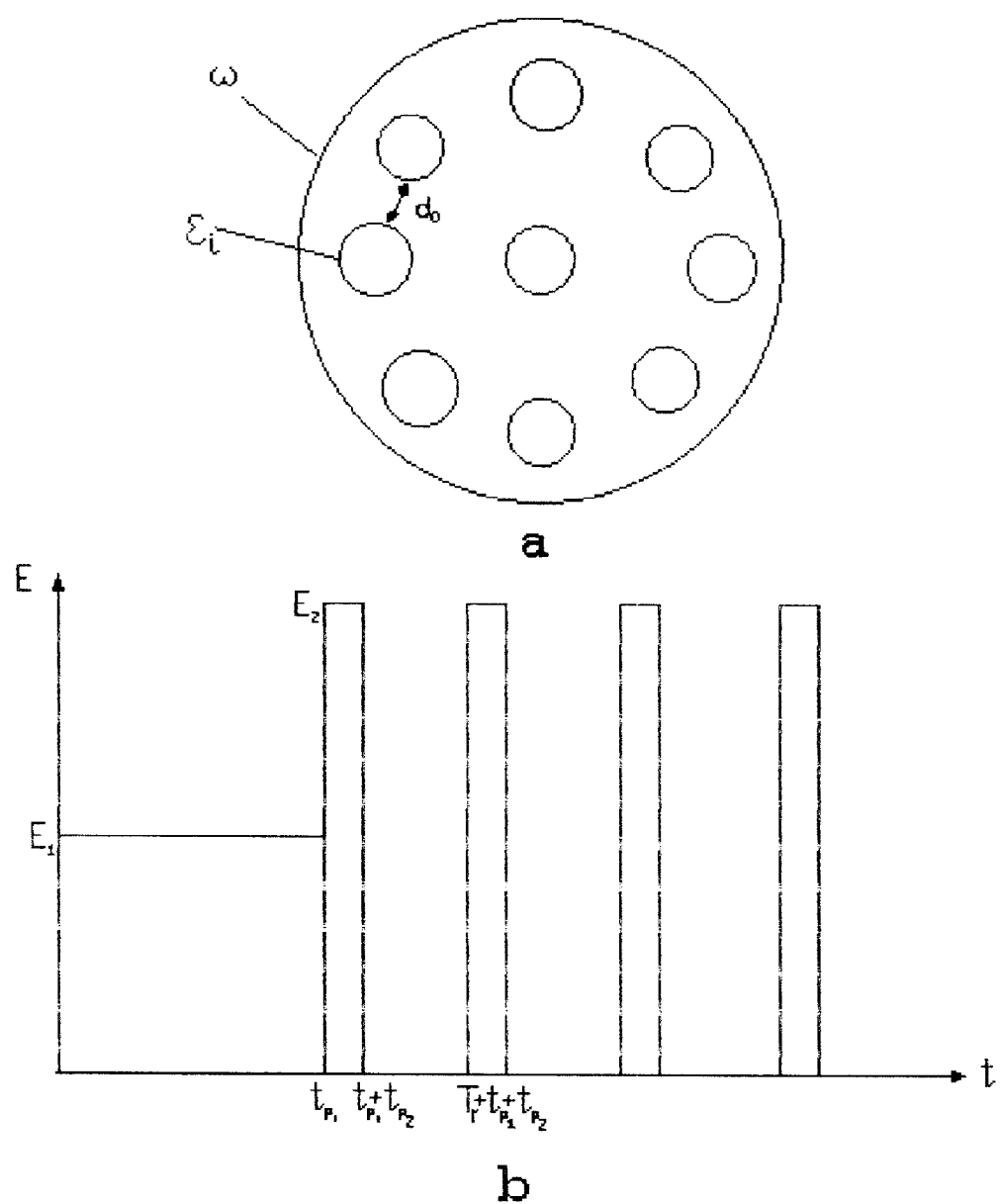
FIGS. 1(*a*) and (*b*) illustrate the method creating small etch points.

The invention comprises a method, systems and apparatus for generating high-resolution laser induced-damage images inside an optically transparent material. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention relates to methods in which laser energy is utilized to generate visible points or areas of damage inside of an object. Such points may be referred to as "etch" points. Preferably, the object comprises a transparent or substantially transparent object through which may be viewed the created etch points. Such material may comprise glass or similar material.

Multiple of such etch points may be utilized to generate or produce a visible image. The image quality is determined by the spatial resolution and by the number of its gray shades. The image resolution is in direct proportion to the number of etch points of the unitary area: more number of points at the unitary area gives higher resolution. The distance between adjacent etch points should be more than the value of minimum distance $d_0$. If the distance is smaller than $d_0$, the internal split can occur. The value of $d_0$ grows down when the sizes of the damages grow down. Consequently, it is necessary to produce small etch points to create high-resolution images. Another reason for creation of small laser-induced damages is to transfer many shades of gray. U.S. Pat. No. 5,637,244 to Erokhin and soviet patent publication 1838163 to P. V. Agrynsky, et. al disclose method of gray shades reproduction by the variation of damage sizes. It is possible only for large laser-induced damages and the way has two disadvantages: 1) it permits to transfer only small number of gray shades; 2) it gives different spatial resolution for areas of the same image having different gray shades. In case of small damages, it is possible to reproduce image gray shades by the variation of the compactness of damage arrangement. The way has no the disadvantages mentioned above.

One or more embodiments of the invention comprise a method for producing a small laser-induced damage by two steps: the first step is generation of the initial electron density, which does not exceed but is nearly equal to the critical electron density corresponding to the breakdown; the second step is generation of the breakdown at a part of the first area and control of the energy amount enclosed into plasma. To provide a better understanding of the essence of the method it is expedient first to consider the breakdown process inside transparent material. Laser-induced damage occurs, when the laser irradiance exceeds a certain threshold energy value, which is characteristic of the transparent material. When the threshold energy value is exceeded, a plasma condition is generated in a laser beam focal spot. The generation of the plasma is associated with a shock wave, which causes a cleavage in the glass or other transparent material.

The threshold energy value increases when:

the pulse duration grows down;

the focal volume grows down;

the wavelength is grows.

The process of laser-induced damage development has several stages:

1) creation of an initial low-density free electron concentration;

2) buildup of this electron concentration until a critical density is reached;

3) absorption of the remainder of the laser pulse by the resulting plasma;

4) an increase in temperature to a value of several thousands of degrees;

5) the generation of an initial thermally-induced sound wave, which is the response of the medium following the thermal expansion of the central region during the laser heating pulse, which sound wave propagates outward;

6) the expansion of created liquid at a rate much slower than the speed of sound;

7) the generation of a pressure-induced sound wave as the liquid forms higher pressure with gradients of the order of several GPa/$\mu$m; and 8) the formation of cracks at the liquid/solid interface (velocities in the range of 1 to 2 km/s).

It is important to note that laser-induced damage will not occur unless a critical number density of free electrons is created. This is a process whereby the applied field accelerates a free electron until it reaches ionizing energy and ionizes a neutral or ion. Under these avalanche conditions the growth of ionization would follow $N_{er}=N_0 \exp(I(E)t)$, where $N_{cr}$ and $N_0$ are the critical and the initial free electron densities respectively, I(E) is the field dependent ionization coefficient of the material and t is the time. Thus for decreasing pulse duration, I(E) must increase in order to maintain the required critical electron density. Another way is to increase the initial electron density $N_0$. The last way permits to create the breakdown by a short pulse without greatly expansion of total plasma energy.

The principal concept of a small damage creation method is to generate the initial electron density $N_0$, which does not exceed but is nearly equal to the critical electron density corresponding to the start of the breakdown. This initial electron density is created at a volume $V_{f1}$. The value of $V_{f1}$ and the laser radiation parameters are determined so as the laser energy necessary for creation of the initial electron density is minimal. When the electron density $N_0$ has been created, the breakdown is produced at a small volume $V_{f2}$, which is a small part of the volume $V_{f1}$. Controlling parameters of the laser radiation creating the breakdown, and controlling the value of the volume $V_{f2}$ it is possible to enclose any small amount of the laser energy in the breakdown plasma and thereby to create a laser-induced damage of any small sizes.

For example, the initial electron density is generated by the first laser radiation having the wavelength $\lambda_1$, and the pulse duration $t_{p1}$. The first laser radiation is focused at the volume $V_{f1}$. At that moment, when the initial electron density reaches the value of $N_0$, the second laser radiation is focused at the volume $V_{f2}$, which is a part of the volume $V_{f1}$. The second laser radiation having wavelength $\lambda_2$, and pulse duration $t_{p2}<t_{p1}$, creates at the volume $V_{f2}$ the electron density exceeding the critical density. Consequently, the area, where breakdown arises, can be substantially smaller than the initial focal area and the laser energy performing the breakdown can be substantially decreased in spite of the increase of the threshold. This method permits to produce any small etch points including such points, which are invisible by naked eye.

A method of generating a small laser-induced damage in accordance with this embodiment of the invention is as follows:

Step 1: The volume $V_{f1}$ of the focal area $\omega$ and the parameters of the first laser radiation (the wavelength $\lambda_1$, the pulse duration $t_{p1}$ and energy $E_1$) are determined so as the initial electron density $N_0$, which is nearly equal to $N_{er}$ but does not exceed the critical electron density corresponding to the breakdown, is reached by minimum laser energy.

Step 2: The second volume $V_{f2}$ of the focal area $\in$ and the parameters of the second laser radiation (the wavelength $\lambda_2$, the pulse duration $t_{p2}$ and the pulse energy $E_2$) are determined by two conditions: 1) the electron density created during one pulse exceeds the critical electron density at the volume $V_{f2}$; 2) the volume of the laser-induced damage created by the breakdown has the right value of $V_d$.

Step 3: The focal area $\omega$ of volume $V_{f1}$ is divided into n areas $\in_1 \ldots \in_n$ which are determined by the following conditions: 1) every area $\in_i$ (i=1 ... n) has volume $V_{f2}$; 2) the distance between adjacent areas is not smaller than minimal distance $d_0$; 3) all n areas $\in_1 \ldots \in_n$ can be treated with second laser radiation pulses for the period of time during in which the initial electron density $N_0$ is sensibly constant.

Step 4: The first laser radiation with parameters determined in Step 1 is generated and focused at the right area $\omega$ of the volume $V_{f1}$.

Step 5: The second laser radiation with parameters determined in Step 2 is generated and focused at the areas $\in_1 \ldots \in_n$ sequentially.

FIG. 1 illustrates the method.

One or more embodiments of the present invention are a method of the image processing previous to production of a high-resolution laser-induced damage image. The method comprises following steps:

Step 1. The transparent material inside which the portrait should be produced is selected.

Step 2. The linear dimension "$d_s$" of an etch point is determined so as the damage has minimal size but it can be seen by naked eye inside the transparent material.

Step 3. The minimum distance do between adjacent etch points is determined so as the internal split of the material does not occur.

Step 4. The image data are supplied to a computer using a digital camera or any other device that converts the image.

Step 5. The pixels block $B_0$ of the computer image is determined so as the image reproduced inside the transparent material has right sizes for the value of $d_s$ determined by steps 2.

Step 6. The block B of pixels, which correspond to the etch points, is separated out from $B_0$ so as the distance between adjacent etch points corresponding to pixels of the block B does not exceed $d_0$ determined by step 3.

Step 7. The pixels of the block B are resampled down so as the greater density of points corresponds to the greater number of gray shades.

Step 8. Taking into account the speed of treatment and laser radiation parameters, the pixels of block $B_1$ are parted so that block $B_1$ is arrangement of areas $\Omega_1 \ldots \Omega_s$; each $\Omega_j$ (j=1 ... s) contains n pixels and all etch points corresponding to the pixels of each area $\Omega_j$ can be generated for the period of time during in which the initial electron density $N_0$ is sensibly constant.

Step 9. Taking into account the refractive index of the transparent material and the depth on which the image should be produced, the block $B_1$ is divided into several areas $\Delta_1 \ldots \Delta_k$ so that each $\Delta_i$ (i=1 ... k) contains M pixels and all etch points corresponding to the pixels of each area $\Delta_i$ can be generated by scanning a laser beam; the laser beam is scanned relative to the direction orthogonal to the central of $\Delta_i$.

Production of the high-resolution laser-induced damage images has the particularity: it is necessary to produce many nearby etch points. Therefore it is very important to disclose the methods of accelerated production of laser-induced damages. Particularly, the production should be done without interruption of the article movement relative to the laser beam and using nonstop movement it is necessary to reproduce different gray shades.

One or more embodiments of the present invention are a method of production of a laser-induced damage image by controlling the speed of the article movement relative to the laser beam: the areas of larger etch point density are passed slower. The method comprises following steps:

Steps 1–7 consist with steps 1–7 of the described method of the image processing previous to production of a high-resolution laser-induced damage image.

Step 8. The minimal movement velocity $V_{min}$ of the transparent material relative to laser beam is determined: $V_{min}=d_0/T_r$, where $T_r$ is the time duration between adjacent laser pulses, $d_0$ is the minimal distance between etch points.

Step 9. The maximum movement velocity $V_{max}$ of the transparent material relative to laser beam is determined: $V_{max}=d_{max}/T_r$, where $T_r$ is the time duration between adjacent laser pulses, $d_0$ is the minimal distance between etch points.

Step 10. The movement velocity V of the transparent material modify in accordance with the function $V=d(V_{max}-V_{min})/(d_{max}-d_0)+(V_{min}d_{max}-V_{max} d_0)/(d_{max}-d_0)$ so that if distance between adjacent etch points is d=D than the relative velocity of the material and the laser beam between these points is $V=D(V_{max}-V_{min})/(d_{max}-d_0)+(V_{min}d_{max}-V_{max} d_0)/(d_{max}-d_0)$.

One or more embodiments of the present invention are a method of production. of a laser-induced damage image by controlling the repetition frequency of the laser pulse radiation: the areas of larger etch points density are irradiated by more repetition frequency. In accordance with the method, time duration $T_r$ between adjacent laser pulses is determined by the function $T_r=D(T_{mi}-T_{max})/(d_{max}-d_0)+(T_{max}d_{max}-T_{min}d_0)/(d_{max}-d_0)$, where $T_{min}=d_0/V$, $T_{max}=d_{max}/V$, V is the relative velocity of the material and the laser beam.

Additional method permitting to accelerate production is the utilization of the devices deflecting a laser beam with high speed. Today, there are many different deflectors deciding the task, but using them for production of laser-induced damage images has one problem: usually, a laser-induced damage image is produced far apart from the transparent material surface. In this case a deflected beam owing to refraction at the surface is focused at a point unmatched with the right point. However, a high-resolution laser-induced damage image has many etch points placed so near to each other that deflector utilization for these points does not give significant their departures. This fact permits to focus beam at a right point by the union of the article movement and the deflector control.

One or more embodiments of the present invention are a method of the union of the article movement and the deflector control. The method comprises following steps:

Step 1. The areas $\delta_i$ (i=1 ... k), corresponding to areas $\Delta_i$ (i=1 ... k) of previous image processing are determined so that a laser beam can be directed by a deflector at all M points of $\delta_i$ with the accuracy higher than $\alpha d_0$, where $\alpha<1$ (for example, $\alpha=0.2$) and $d_0$ is the minimum distance between adjacent small etch points.

Step 2. A table drive sets a work article so that a laser beam is directed at the center of $\delta_i$.

Step 3. "M" laser pulses are directed sequentially at all M points of $\delta_i$ by controlling a deflector.

Step 4. The table drive moves the article to the next position so that a laser beam is directed at the center of $\delta_{i+1}$ and M laser pulses is directed sequentially at all M points of $\delta_{i+1}$ by controlling a deflector. Similarly all other etch points are produced.

Figure 2:
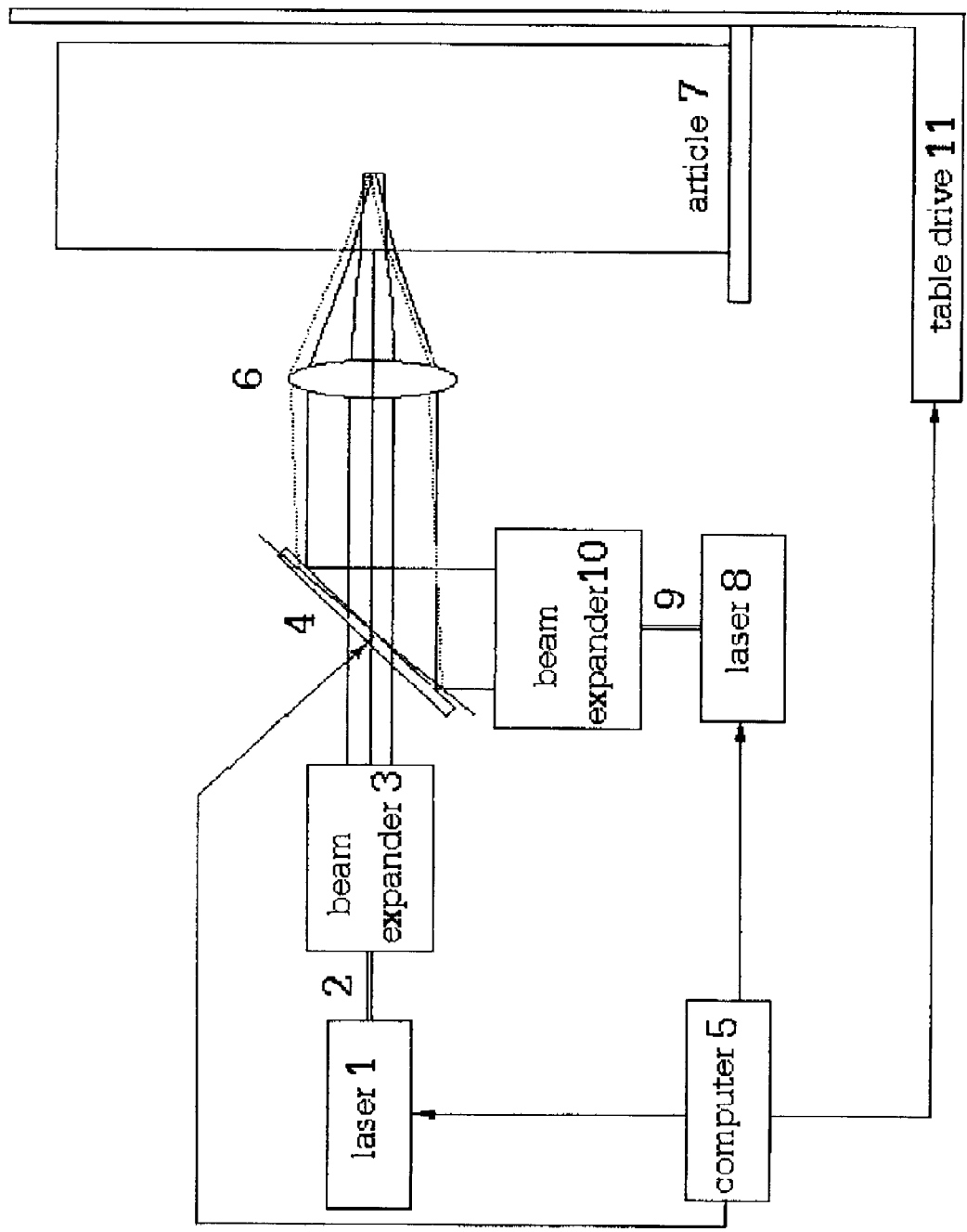
FIGS. 2 illustrates in block-diagram form a laser system producing high-resolution laser-induced damage images inside a transparent material by generating small etch points; the system. comprises: two lasers 1 and 8; two beam expanders 3 and 10, a beam combiner-deflector 4, a focusing optical system 6, a computer 5, an article 7, a table drive 11.

Other embodiments of the invention comprise a system for producing laser-induced damage images by small etch points. Reference is now made to FIG. 2, which illustrates in block-diagram form a laser etching system, which can be used to produce high-resolution laser-induced damage images. The system comprises: two lasers 1 and 8; two beam expanders 3 and 10, a beam combiner-deflector 4, a focusing optical system 6, a computer 5, an article 7, a table drive 11.

The laser 1 generates a narrow, pulse beam 2 with the wavelength $\lambda_1$ (for example, $\lambda_1=1.06$ μm), the pulse duration $t_{p1}$ (for example, several tens of nanoseconds) and the energy $E_1$. The parameters are such that the laser radiation being focused at said article creates the initial electron density $N_0$, which is nearly equal but does not exceed the critical electron density corresponding to the breakdown. The beam 2 passes through said beam expander 3, said beam combiner-deflector 4 and is directed to the said optical system 6. The said table drive 11 sets the said article 7 so that said beam 2 is perpendicular to the article surface and the said optical system 6 focuses the said beam 2 at the center of area $\omega_1$.

The laser 8 generates said beam 9 with the wavelength $\lambda_2$ ($\lambda_2 \leq \lambda_1$), the pulse duration $t_{p2} \ll t_{p1}$ (for example, a few picoseconds) and the energy level $E_2$. The parameters are such that the laser radiation being focused at said article creates the breakdown and the formed laser-induced damage has the right volume $V_d$. The beam 9 passes through a beam expander 10, the beam combiner-deflector 4 and is directed to the optical system 6. The said system focuses the said beam 9 at the area $\in_1$, which is a small part of the area $\omega_1$. The expansion factor of the beam expander 10 is a lot more than the factor of the expander 3, so as the volume of the area $\in_1$ is far less the volume of the area $\omega_1$.

There are three different situations: the first—the area $\delta$, in which all M points can be irradiated by the said beam combiner-deflector 4, is equal to said focal area $\omega$; the second—the said area $\delta$ is smaller the said focal area $\omega$; the third—said area $\delta$ is smaller the said focal area $\omega$. In the following description the first situation is only disclosed in detail so as not to obscure the invention. One skilled in the art can utilize the system without extra description of other situation.

The said computer 5 controls the said beam combiner-deflector 4 so that the pulses of the said beam 9 are focused at areas $\in_1 \ldots \in_n$ successively. After that the said table drive 11 shifts said article 7 so that said beam 2 is perpendicular to the article surface and the said optical system 6 focuses the said beam 2 at the center of the said area $\omega_2$. After said beam 2 creates the initial electron density $N_0$, the said laser 8 generates n pulses, which successively irradiate areas $\in_1 \ldots \in_n$ of the area $\omega_2$ by the said beam combiner-deflector 4 and so on.

I claim:

1. A method for producing high-resolution laser-induced damage images inside an article of transparent material comprising:

producing small laser-induced damages by generation of initial electron density inside a focal area and creation of a breakdown inside a part of said focal area;

processing an image by converting a regular image into an arrangement of points united into areas so that all damages corresponding to the points of each area can be produced by scanning a laser beam relative to a direction orthogonal to a surface of said article;

producing different gray shades of said laser-induced damages by variation of a density of damage arrangement;

producing said laser-induced damages by directing said laser beam into predetermined points in said material by joint use of an optical scanner and a drive table for moving said article, and producing laser-induced damages without interruption of article movement relative to the laser beam and creating image areas with different brightness by modulation of a speed of said article.

2. The method in accordance with claim 1 wherein said small laser-induced damages are produced by two steps: first, generating an initial electron density $N_0$, which does not exceed but is nearly equal to the critical electron density corresponding to the start of the breakdown; this initial electron density created at a volume $V_{f1}$; second, generating the breakdown at a small volume $V_{f2}$, which is a small part of the volume $V_{f1}$, and controlling laser radiation parameters and the value of the volume $V_{f1}$ so to enclose a small amount of laser energy in breakdown plasma and thereby creating the small laser-induced damage.

3. The method in accordance with claim 1 wherein said small laser-induced damages are produced by two laser radiations of different laser energy values: the first radiation has a first energy value as to create at a predetermined area the initial electron density, which does not exceed a critical electron density but is nearly equal to it; the second radiation has a second energy level as to create electron density exceeding the critical value.

4. The method in accordance with claim 1 wherein said small laser-induced damages are produced by two pulse laser radiations of different pulse durations: the pulse duration of a first laser radiation is determined so that the initial electron density is reached by minimum laser energy; the pulse duration of a second laser radiation is determined so that the total energy of a created plasma is sufficient to create damage of a desired value.

5. The method in accordance with claim 1 wherein said small laser-induced damages are produced by focusing two laser radiations at different volumes: the value $V_{f1}$ of a first laser radiation is determined so that the initial electron density is reached by minimum laser energy; the value $V_{f2}$ of a second laser radiation is a small part of $V_{f1}$ and Is determined so that a volume of the laser-induced damage created by the breakdown corresponds to a desired value.

6. The method in accordance with claim 5 wherein a number "n" of said second laser radiation is determined by the split of volume $V_{f1}$ into n areas $\in_1 \ldots \in_n$ which meet the requirements:

1) every area $\in_i$ (i=1 ... n) has volume $V_{f2}$; 2) the distance between adjacent areas is not smaller than minimal distance $d_0$; 3) all n areas $\in_1 \ldots \in_n$ can be treated with second laser radiation pulses for the period of time during in which the initial electron density $N_0$ is sensibly constant.

7. The method in accordance with claim 1 wherein said step of producing gray shades is produced by the image processing so that a greater density of etch points corresponds to a greater number of gray shades but distance between adjacent etch points is not smaller than the minimal distance $d_0$.

8. The method in accordance with claim 7 wherein said step of producing gray shades comprises controlling the speed of movement of said article in accordance with the etch point density of the image areas.

9. The method in accordance with claim 1 wherein said step of producing gray shades comprises controlling the repetition frequency of a pulse of radiation of said laser beam: the areas of larger etch point density radiated by increased repetition frequency.

10. The method in accordance with claim 1 wherein the laser beam is directed into the points of a predetermined area of the transparent material by two steps: the first—using a table drive to position a work article so that the laser beam is directed at a center of said area; and second—deflecting said beam with a deflector to direct said beam at all points of said area successively.

11. A system producing high-resolution laser-induced damage images inside an article of transparent material by generation of small etch prints comprising:

a first laser for generating a first laser beam with parameters: a wavelength $\lambda_1$ a pulse duration $t_{p1}$ and an energy $E_1$;

a second laser for generating a s nd laser beam with parameters: a wavelength $\lambda_2$, said $\lambda_2 < \lambda_1$; a pulse duration $t_{p2}$ and an energy level $E_2$;

a first beam expander adapted to expand said first beam;

a second beam expander adapted to expand said second beam with an expansion factor which is greater than the expansion factor of said first beam expander;

a beam combiner-deflector to control direction of the second laser beam;

an optical system for focusing said first beam at a focal volume $V_{f1}$ and said second beam at a focal volume $V_{f2}$ so as $V_{f1} << V_{f2}$;

a drive table for moving an article relative to first and second laser beams; and a computer for controlling first and second lasers creating said first and second laser beams, said beam combiner-deflector and said drive table.

* * * * *